(12) United States Patent
Aguilar-Macias et al.

(10) Patent No.: US 9,852,286 B2
(45) Date of Patent: *Dec. 26, 2017

(54) AUTOMATED PASSWORD GENERATION AND CHANGE

(71) Applicant: Okta, Inc., San Francisco, CA (US)

(72) Inventors: Hector Aguilar-Macias, Palo Alto, CA (US); Reman P. Child, San Francisco, CA (US); Xin Gu, San Francisco, CA (US); Jonathan R. Todd, San Francisco, CA (US); Thomas M. Belote, San Francisco, CA (US)

(73) Assignee: Okta, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/723,056

(22) Filed: May 27, 2015

(65) Prior Publication Data

US 2016/0036806 A1 Feb. 4, 2016

Related U.S. Application Data

(60) Provisional application No. 62/032,390, filed on Aug. 1, 2014.

(51) Int. Cl.
| | |
|---|---|
| *G06F 15/16* | (2006.01) |
| *H04L 29/06* | (2006.01) |
| *G06F 21/45* | (2013.01) |
| *G06F 21/46* | (2013.01) |
| *H04L 29/08* | (2006.01) |

(52) U.S. Cl.
CPC ............ *G06F 21/45* (2013.01); *G06F 21/46* (2013.01); *H04L 63/083* (2013.01); *H04L 63/0815* (2013.01); *H04L 63/0846* (2013.01); *H04L 63/1483* (2013.01); *H04L 67/20* (2013.01); *H04L 67/34* (2013.01); *H04L 67/02* (2013.01)

(58) Field of Classification Search
CPC ... H04L 63/0815; H04L 63/083; H04L 67/02; H04L 63/1483; G06F 21/45
USPC ......... 713/168–174, 182–186, 202; 709/206, 709/225, 229, 249, 389; 726/2–8
See application file for complete search history.

(56) References Cited

U.S. PATENT DOCUMENTS

| | | | |
|---|---|---|---|
| 2002/0078386 A1 | 6/2002 | Bones et al. | |
| 2005/0076239 A1 | 4/2005 | Locke et al. | |
| 2006/0224511 A1* | 10/2006 | Allemann | G06F 21/55 705/43 |
| 2007/0169174 A1* | 7/2007 | Critten | G06F 21/34 726/3 |
| 2007/0226783 A1 | 9/2007 | Mimlitsch | |

(Continued)

OTHER PUBLICATIONS

PCT International Search Report and Written Opinion for PCT/US2015/042737, dated Feb. 22, 2016, 10 Pages.

*Primary Examiner* — Evans Desrosiers
(74) *Attorney, Agent, or Firm* — Fenwick & West LLP

(57) ABSTRACT

An identity management system detects the occurrence of a trigger event, such as a time period expiration, or an action on the identity management system. The identity management system accordingly generates a new password for an account of a user on a third-party service and causes the account of the user on the third-party service to use the new password. The identity management system may also a mobile device management system to configure a client of the user with the new password.

17 Claims, 2 Drawing Sheets

(56) References Cited

U.S. PATENT DOCUMENTS

| | | | |
|---|---|---|---|
| 2010/0174758 A1* | 7/2010 | Radenkovic | G06F 21/41 707/803 |
| 2013/0033971 A1* | 2/2013 | Stier | H04N 21/25866 369/1 |
| 2013/0074172 A1 | 3/2013 | Gargaro et al. | |
| 2013/0212654 A1 | 8/2013 | Dorfman et al. | |

* cited by examiner

AUTOMATED PASSWORD GENERATION AND CHANGE

CROSS REFERENCE TO RELATED APPLICATIONS

The application claims the benefit of Provisional Application No. 62/032,390, filed on Aug. 1, 2014, which is hereby incorporated herein by reference.

BACKGROUND

1. Technical Field

This application generally relates to the field of user account information and, in particular, to automated generation and change of passwords.

2. Background Information

A software application that requires a person to log in to an account usually uses a username/password combination as the authentication mechanism. Therefore, people who have accounts for several different applications must remember several passwords. To make this task easier, people tend to use easy-to-remember passwords, variations of relatively strong passwords, and/or the same password for all of the applications. The result is that user/password combinations are stored in several server-side databases (from the different application providers), which increases the security exposure. If an account from one of the applications is compromised, then the attacker can use that user's credentials to compromise an account for another application.

SUMMARY

In one embodiment, a computer-implemented method performed by an identity management system comprises detecting occurrence of a trigger event, and, responsive to the detecting of the trigger event: generating a new password for an account of a user on a third-party service, and causing the account of the user on the third-party service to use the new password.

In one embodiment, a non-transitory computer-readable storage medium has instructions executable by a processor, the instructions comprising: instructions for detecting occurrence of a trigger event; and instructions for, responsive to the detecting of the trigger event: generating a new password for an account of a user on a third-party service, and causing the account of the user on the third-party service to use the new password.

In one embodiment, a computer system comprising a computer processor; and a non-transitory computer-readable storage medium instructions executable by a processor, the instructions comprising instructions for detecting occurrence of a trigger event, and instructions for, responsive to the detecting of the trigger event: generating a new password for an account of a user on a third-party service, and causing the account of the user on the third-party service to use the new password.

DETAILED DESCRIPTION

The Figures (FIGS.) and the following description describe certain embodiments by way of illustration only. One skilled in the art will readily recognize from the following description that alternative embodiments of the structures and methods illustrated herein may be employed without departing from the principles described herein. Reference will now be made to several embodiments, examples of which are illustrated in the accompanying figures. It is noted that wherever practicable similar or like reference numbers may be used in the figures and may indicate similar or like functionality.

Figure 1:
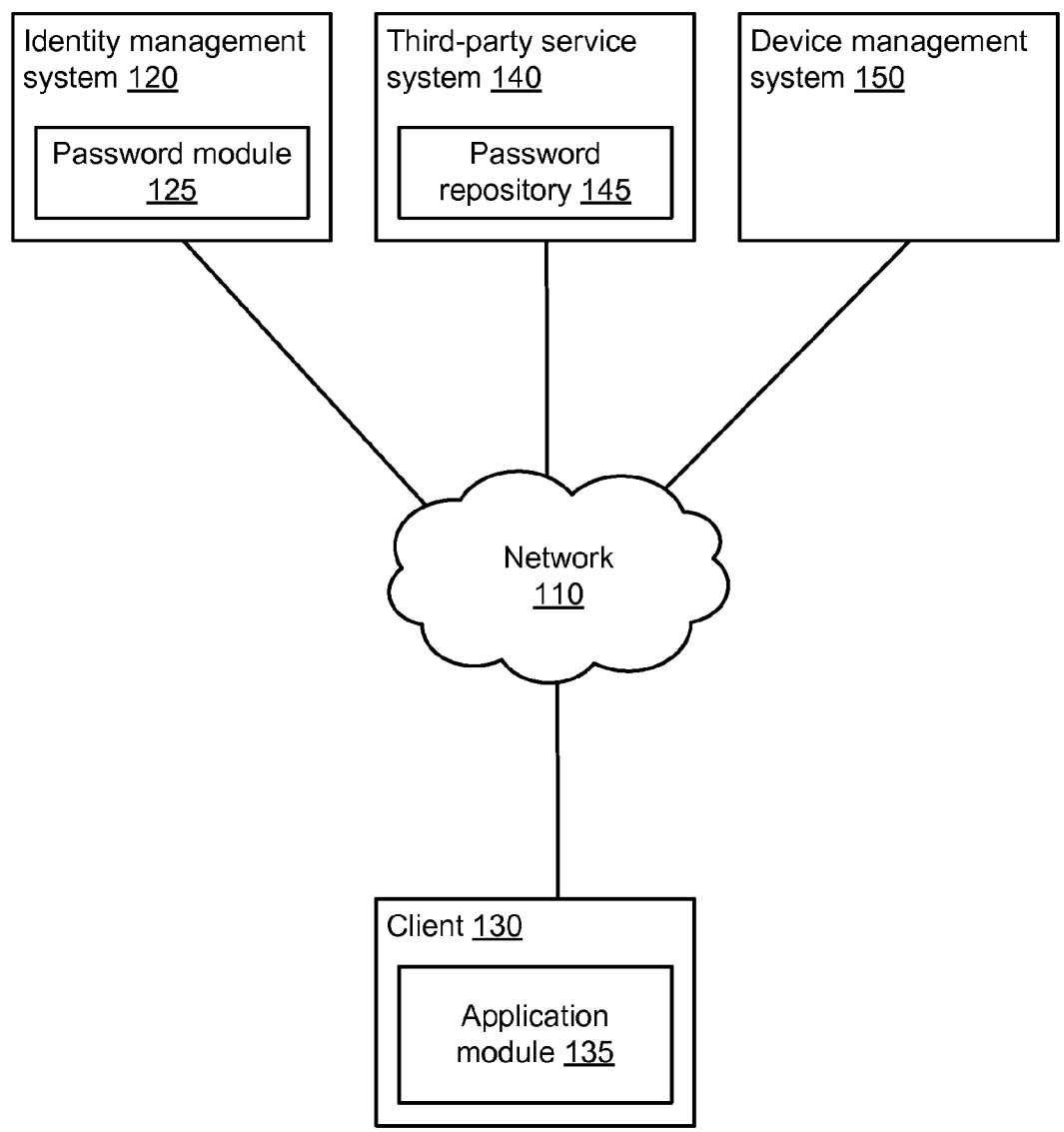
FIG. 1 is a high-level block diagram illustrating an environment for generating and changing passwords in an automated manner, according to one embodiment.

FIG. 1 is a high-level block diagram illustrating an environment 100 for generating and changing passwords in an automated manner, according to one embodiment. The environment 100 may be maintained by an enterprise (e.g., an identity management service) that provides a password service that generates passwords for use with third-party service user accounts and interacts with third-party services to change passwords on user accounts. For example, an identity management system 120 generates a password and interacts with a third-party service system 140 to modify a user account so that the user account uses the newly-generated password. Since the password generation and change is automated, it is easy to use unique, secure passwords for each user account and change these passwords periodically.

As shown, the environment 100 includes a network 110, an identity management system 120, a client 130, a third-party service system 140, and a device management system 150. While one identity management system 120, one client 130, one third-party service system 140, and one device management system 150 are shown in the embodiment depicted in FIG. 1 for clarity, other embodiments can have different numbers of identity management systems, clients, third-party service systems, and device management systems.

The network 110 represents the communication pathway between the identity management system 120, the client 130, the third-party service system 140, and the device management system 150. In one embodiment, the network 110 uses standard wireless and wired communications technologies and protocols and can include the Internet and associated protocols. In another embodiment, the entities on the network 110 can use custom and/or dedicated data communications technologies.

A client 130 is a computer (or set of computers) that enables a user to access various third-party services. The client 130 can be, for example, a desktop computer, a laptop computer, a tablet computer, or a smart phone. The client 130 includes one or more application modules 135. A particular application module 135 enables the client 130 to access third-party services provided by a particular third-party service system 140. For example, an application module 135 interacts with a third-party service system 140 to log in to a user account of the third-party service system (e.g., using a username/password combination). After logging in, the application module 135 interacts with the third-party service system 140 to access various services.

In one embodiment, the application module 135 is a native application that executes on an operating system of the client 130. In another embodiment, the application module 135 is a plugin for a web browser of the client 130. In yet another embodiment, the application module 135 is a link to a webpage provided by the third-party service system 140.

The identity management system 120 is a computer (or set of computers) that provides identity management services. Identity management services include, for example, managing user accounts at various third-party services. For example, the identity management system 120 creates user accounts at various third-party services, configures the accounts with usernames and passwords, and can modify, deactivate, and delete the accounts if necessary.

In one embodiment, the identity management system 120 also provides single sign-on (SSO) services. For example, a user authenticates himself to the identity management system 120 by logging in to the identity management system using the client 130. The identity management system 120 then provides the client 130 with a single portal from which the user can access various third-party service user accounts without entering any additional authentication information (e.g., a username/password combination). For example, the user uses the portal to specify a particular third-party service, and the client 130 notifies the identity management system 120 accordingly. The identity management system 120 then accesses the appropriate authentication information (stored within the identity management system) and uses it to log in to the user's account at the specified third-party service system 140.

The identity management system 120 includes a password module 125. The password module 125 generates passwords for use with user accounts at various third-party services. The password module 125 also interacts with third-party services to change passwords on user accounts. For example, the password module 125 generates a password and interacts with a third-party service system 140 to modify a user account so that the user account uses the newly-generated password.

In one embodiment, the password module 125 interacts with the third-party service system 140 via an application programming interface (API) provided by the third-party service system. In another embodiment, the password module 125 interacts with the third-party service system 140 via a configurable web script that includes information regarding how to access the third-party service system. In one embodiment, the script uses machine learning techniques or explicit definitions to cause the third-party service system 140 to change a password. The machine learning techniques are, for example, related to heuristics that are used to identify webpages that request login information (e.g., a username/password combination). In one embodiment, the script conforms to the Extensible Markup Language (XML) standard. In another embodiment, a particular script is stored in association with a reference to a particular third-party service system 140. In yet another embodiment, the script is generated automatically.

In one embodiment, the password module 125 stores the newly-generated password. The stored password can be used, for example, for single sign-on purposes or recovered if forgotten. The password is stored encrypted with a customer-level key (an enterprise customer of the identity management system 120), encrypted with a user-level key, or unencrypted. Note that an encrypted password need not be decrypted unless and until the password needs to be changed (or provided for login purposes). If the password is stored encrypted with a user-level key, then the password can be decrypted by only the client 130. Since decryption does not occur at the identity management system 120, the identity management system does not have access to the password in its decrypted state. As a result, the identity management system 120 cannot recover the password. In one embodiment, a user-level key is generated based on a cryptographic function applied to a user's identity management system password.

If a third-party service account has been assigned a new password, then the application module 135 must be configured with the new password in order to continue to access the third-party services. In one embodiment, the password module 125 sends the newly-generated password to the user in some way (e.g., by text message or email). In that embodiment, the user enters the password into the application module 135 for use during future logins.

Recall that the password module 125 generates passwords for use with user accounts at various third-party services. In one embodiment, the password module 125 generates unique, secure, and random passwords that satisfy corresponding customizable rules for complexity. A set of complexity rules corresponds to one of the various third-party services and specifies properties of a password required by that third-party service, such as minimum password length, or minimum numbers of characters of a certain class (e.g., numbers, symbols, or uppercase letters). These complexity rules can be predefined and stored in association with references to particular third-party service systems 140, so that different third-party service systems can have different password generation rules.

Passwords can be generated on a per-application basis (i.e., a user has one password for the application, regardless of the device on which the application is installed) or on a per-client basis (i.e., for a given application that supports per-client passwords, a user has a different password for the application on each client device from which the user uses the application). Per-client passwords are more secure since, if a client 130 is compromised, only that client's password is compromised. However, the authentication of a per-client password requires that the identity management system 120 be the configured identity provider for the application module 135. In one embodiment, information is encoded on clients 130 that enables per-client passwords to have different authorization levels.

The identity management system 120 executes the password module 125 (to generate a new password and interact with a third-party service system 140 to use the newly-generated password for a user account) based on occurrence of a trigger event. In one embodiment, possible trigger events include: a user logging in to the identity management system 120, a user changing his password for the identity management system 120, a user requesting that a password be changed, an administrator requesting that a password be changed, a third-party service account being created, or a time period expiring (so that trigger events would occur periodically). If account passwords are not changed periodically, then an attacker has a large time window to obtain and use credentials without detection. If account passwords are changed periodically, then an administrator can control the length of time that a password is valid, thereby greatly reducing the attack surface. Note that after a trigger event occurs, the identity management system 120 can execute the password module 125 immediately or after a configurable delay.

Recall that, in one embodiment, the identity management system 120 provides single sign-on services. For example, the identity management system 120 uses stored authentication information to log in to a user's account at a third-party service system 140. In one embodiment, after the identity management system 120 logs in a particular number of times, then this constitutes a trigger event, so the identity management system executes the password module 125. If the particular number of times is one, then the password that is used to log in to the third-party service system 140 is effectively a one-time password, since it is destroyed or invalidated after one use.

In the case of such one-time passwords, in particular, the identity management system 120 can take additional steps to thwart and detect phishing (e.g., when a user requests and obtains his authentication information for an application from the identity management system 120, and then inadvertently allows a phisher to obtain it). First, since the identity management system 120 changes the authentication information for a given third-party service 140 at each single sign-on of the user, authentication information (e.g., password) captured by the phisher for a particular third party service will only be usable by the phisher until the next sign-on by the legitimate user, at which time the authentication information will be changed, and thus the phished authentication information will become useless. If the phisher chooses to use the phished authentication information for the third-party service 140 and then changes the password via the user interface of the service 140, the identity management system 120 will detect that its subsequent attempt to authenticate the legitimate user failed, and in consequence notify the user or an administrator of the suspicious activity, allowing them to reset the authentication information and lock the phisher out.

The third-party service system 140 is a computer (or set of computers) that provides various third-party services. A third-party service is, for example, a cloud-based application service, a web-based application service, a network-based application service, an on-premises application, an enterprise application, a consumer application, or a custom-built internal application. The third-party service system 140 maintains user accounts that are logged into in order to access the third-party services. Authentication information for these user accounts (e.g., username/password combinations) is stored in a password repository 145 of the third-party service system 140. The third-party service system 140 provides an API that can be used by external systems to interact with the third-party service system. For example, the identity management system 120 can use a third-party service system API to log in to a user account of the third-party service system 140. As another example, the identity management system 120 can use a third-party service system API to cause the third-party service system 140 to change the password of a user account (e.g., by modifying information stored in the password repository 145).

The device management system 150, which is optional, is a computer (or set of computers) that provides services for managing clients 130. Device management services include, for example, securely transporting information to clients 130 and/or configuring clients. For example, the device management system 150 can configure an application module 135 of a client 130. If a third-party service account has been assigned a new password, then the application module 135 must be configured with the new password in order to continue to access the third-party services. If the device management system 150 performs this configuration, then the password change is invisible to the user. In particular, the user does not need to configure the application module 135 manually, such as by entering the password.

The device management system 150 provides an API that can be used by external systems to interact with the device management system. For example, the identity management system 120 can use a device management system API to cause the device management system 150 to configure an application module 135 of a client 130 with particular authentication information (e.g., a username/password combination).

In one embodiment, the device management system 150 has mobile device management (MDM) capabilities. For example, the device management system 150 uses a device management transport protocol to securely transport information to a client 130. This embodiment is useful when the client 130 is a mobile device. Examples of device management systems 150 include the MobileIron platform from MobileIron, Inc., MaaS360 from Fiberlink Communications Corp., and AirWatch from AirWatch, LLC. In some embodiments, the identity management system 120 obliges the clients 130 to authorize MDM, or automatically configures the clients to use MDM, in order to for a particular client 130 to use the services of the identity management system. In some embodiments, the identity management system 120 configures users to use per-client passwords, generating different passwords for each client of a particular user, and using MDM to store each per-client passwords locally on the client 130 to which the per-client password corresponds.

In one embodiment, the environment 100 operates as follows: A trigger event occurs. Responsive to the trigger event, the password module 125 of the identity management system 120 generates a new password. The password module 125 interacts with the third-party service system 140. Responsive to the interaction, the third-party service system 140 modifies the password repository 145 so that a user account uses the newly-generated password. Optionally, the password module 125 interacts with the device management system 150. Responsive to the interaction, the device management system 150 configures the application module 135 of the client 130 to use the newly-generated password. Optionally, the password module 125 sends the newly-generated password to the user in some way (e.g., by text message or email).

Figure 2:
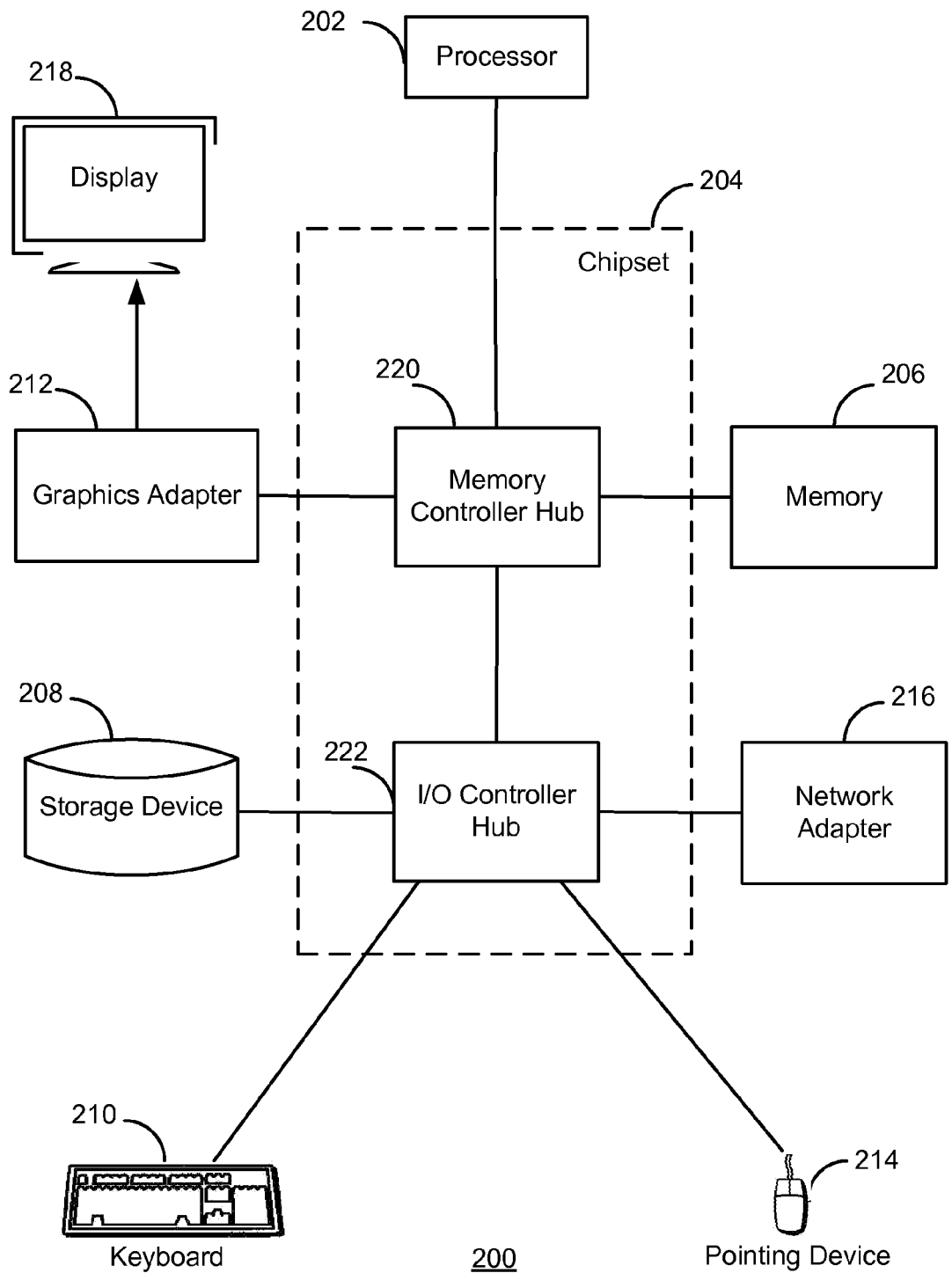
FIG. 2 is a high-level block diagram illustrating an example of a computer for use as one or more of the entities illustrated in FIG. 1, according to one embodiment.

FIG. 2 is a high-level block diagram illustrating an example of a computer 200 for use as one or more of the entities illustrated in FIG. 1, according to one embodiment. Illustrated are at least one processor 202 coupled to a chipset 204. The chipset 204 includes a memory controller hub 220 and an input/output (I/O) controller hub 222. A memory 206 and a graphics adapter 212 are coupled to the memory controller hub 220, and a display device 218 is coupled to the graphics adapter 212. A storage device 208, keyboard 210, pointing device 214, and network adapter 216 are coupled to the I/O controller hub 222. Other embodiments of the computer 200 have different architectures. For example, the memory 206 is directly coupled to the processor 202 in some embodiments.

The storage device 208 includes one or more non-transitory computer-readable storage media such as a hard drive, compact disk read-only memory (CD-ROM), DVD, or a solid-state memory device. The memory 206 holds instructions and data used by the processor 202. The pointing device 214 is used in combination with the keyboard 210 to input data into the computer system 200. The graphics adapter 212 displays images and other information on the display device 218. In some embodiments, the display device 218 includes a touch screen capability for receiving user input and selections. The network adapter 216 couples the computer system 200 to the network 110. Some embodiments of the computer 200 have different and/or other components than those shown in FIG. 2. For example, the management server 120, the firewall 140, the agent 160, the agent/OPA interface 170, and/or the OPA device 180 can be formed of multiple blade servers and lack a display device, keyboard, and other components.

The computer 200 is adapted to execute computer program modules for providing functionality described herein. As used herein, the term "module" refers to computer program instructions and/or other logic used to provide the specified functionality. Thus, a module can be implemented in hardware, firmware, and/or software. In one embodiment, program modules formed of executable computer program instructions are stored on the storage device 208, loaded into the memory 206, and executed by the processor 202.

The above description is included to illustrate the operation of certain embodiments and is not meant to limit the scope of the invention. The scope of the invention is to be limited only by the following claims. From the above discussion, many variations will be apparent to one skilled in the relevant art that would yet be encompassed by the spirit and scope of the invention.

What is claimed is:

1. A computer-implemented method performed by an identity management system, the method comprising:
   detecting an occurrence of a trigger event;
   responsive to the detecting of the occurrence of the trigger event:
     selecting a third-party service from one or more third-party services, wherein a user has an account on each of the third-party services and the identity management system comprises one or more scripts, each script corresponding to a third-party service,
     identifying password complexity rules associated with the selected third-party service,
     generating a random password that satisfies the password complexity rules as a new password for an account of the user on the selected third-party service,
     selecting a script corresponding to the selected third-party service to use for the account when causing the account of the user on the selected third-party service to use the new password, and
     causing the account of the user on the selected third-party service to use the new password, the causing comprising:
       using the selected script to learn heuristics to identify webpages that request login information, and
       applying the learned heuristics to enter the new password into a first one of the webpages that request login information;
     attempting to log the user in to the selected third-party service;
     determining that the attempt failed; and
     responsive to determining that the attempt failed, sending a notification of suspicious activity.

2. The computer-implemented method of claim 1, wherein the trigger event is a time period expiring.

3. The computer-implemented method of claim 1, wherein the trigger event is a user changing the user's password for the identity management system.

4. The computer-implemented method of claim 1, wherein the trigger event is a user logging in to the identity management system.

5. The computer-implemented method of claim 1, wherein the identity management system further provides single sign-on (SSO) services to the user with respect to a plurality of accounts of the user on the third-party services, and wherein the trigger event is a user using the SSO services of the identity management system to sign on to the account of the user on the selected third-party service.

6. The computer-implemented method of claim 1, further comprising sending the new password to the user via one of text message and email.

7. The computer-implemented method of claim 1, further comprising causing a mobile device management system to configure a client of the user with the new password.

8. The computer-implemented method of claim 1, wherein the user has a plurality of clients, the method further comprising generating a different new password for the user on the selected third-party service for each of the clients.

9. A non-transitory computer-readable storage medium having instructions executable by a processor, the instructions comprising:
   instructions for detecting an occurrence of a trigger event;
   instructions for responsive to the detecting of the occurrence of the trigger event:
     selecting a third-party service from one or more third-party services, wherein a user has an account on each of the third-party services and the identity management system comprises one or more scripts, each script corresponding to a third-party service,
     identifying password complexity rules associated with the selected third-party service,
     generating a random password that satisfies the password complexity rules as a new password for an account of the user on the selected third-party service,
     selecting a script corresponding to the selected third-party service to use for the account when causing the account of the user on the selected third-party service to use the new password, and
     causing the account of the user on the selected third-party service to use the new password, the causing comprising:
       using the selected script to learn heuristics to identify webpages that request login information, and
       applying the learned heuristics to enter the new password into a first one of the webpages that request login information;
   instructions for attempting to log the user in to the selected third-party service;
   instructions for determining that the attempt failed; and
   instructions for responsive to determining that the attempt failed, sending a notification.

10. The non-transitory computer-readable storage medium of claim 9, wherein the trigger event is a time period expiring.

11. The non-transitory computer-readable storage medium of claim 9, wherein the trigger event is the user logging in to the identity management system.

12. The non-transitory computer-readable storage medium of claim 9, wherein the identity management system further provides single sign-on (SSO) services to the user with respect to a plurality of accounts of the user on the third-party services, and wherein the trigger event is a user using the SSO services of the identity management system to sign on to the account of the user on the selected third-party service.

13. The non-transitory computer-readable storage medium of claim 9, further comprising causing a mobile device management system to configure a client of the user with the new password.

14. The non-transitory computer-readable storage medium of claim 9, wherein the user has a plurality of clients, the method further comprising generating a different new password for the user on the selected third-party service for each of the clients.

15. The non-transitory computer-readable storage medium of claim 9, wherein the trigger event is the user changing the user's password for the identity management system.

16. The non-transitory computer-readable storage medium of claim 9, further comprising instructions for sending the new password to the user via one of text message and email.

17. A computer system comprising:
a computer processor; and
a memory having instructions that when executed by the computer processor perform actions comprising:
  detecting an occurrence of a trigger event,
  responsive to the detecting of the occurrence of the trigger event:
    selecting a third-party service from one or more third-party services, wherein a user has an account on each of the third-party services and the identity management system comprises one or more scripts, each script corresponding to a third-party service,
    identifying password complexity rules associated with the selected third-party service,
    generating a random password that satisfies the password complexity rules as a new password for an account of the user on the selected third-party service,
    selecting a script corresponding to the selected third-party service to use for the account when causing the account of the user on the selected third-party service to use the new password, and
    causing the account of the user on the selected third-party service to use the new password, the causing comprising:
      using the selected script to learn heuristics to identify webpages that request login information, and
    applying the learned heuristics to enter the new password into a first one of the webpages that request login information,
  attempting to log the user in to the selected third-party service,
  determining that the attempt failed, and
  responsive to determining that the attempt failed, sending a notification.

* * * * *

UNITED STATES PATENT AND TRADEMARK OFFICE
CERTIFICATE OF CORRECTION

PATENT NO. : 9,852,286 B2
APPLICATION NO. : 14/723056
DATED : December 26, 2017
INVENTOR(S) : Hector Aguilar-Macias et al.

It is certified that error appears in the above-identified patent and that said Letters Patent is hereby corrected as shown below:

In the Claims

In Column 7, Claim 3, Line 56, delete "wherein the trigger event is a user" and insert --wherein the trigger event is the user--.

In Column 7, Claim 4, Line 59, delete "wherein the trigger event is a user" and insert --wherein the trigger event is the user--.

In Column 7, Claim 5, Line 65, delete "wherein the trigger event is a user" and insert --wherein the trigger event is the user--.

In Column 8, Claim 9, Line 19-20, delete "and the identity management system comprises" and insert --and an identity management system comprising--.

In Column 8, Claim 12, Line 55, delete "wherein the trigger event is a user" and insert --wherein the trigger event is the user--.

In Column 9, Claim 17, Line 18-19, delete "and the identity management system comprises" and insert --and an identity management system comprising--.

Signed and Sealed this
Fifth Day of June, 2018

Andrei Iancu
*Director of the United States Patent and Trademark Office*